(12) United States Patent
Wedel et al.

(10) Patent No.: US 7,821,500 B2
(45) Date of Patent: Oct. 26, 2010

(54) INDUCTIVE JOYSTICK (75) Inventors: Martin Wedel, Furulund (SE); Fredrik Palmqvist, Staffanstorp (SE); Gustav Fagrenius, Dalby (SE); Tina E. Ralin, Malmo (SE); Ola S. Hakansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 797 days.

(21) Appl. No.: 11/747,309

(22) Filed: May 11, 2007

(65) Prior Publication Data
US 2008/0280640 A1 Nov. 13, 2008

(51) Int. Cl.
*G06F 3/02* (2006.01)
(52) U.S. Cl. .................................. 345/169; 345/156
(58) Field of Classification Search .......... 345/156–184
See application file for complete search history.

(56) References Cited

U.S. PATENT DOCUMENTS

| 4,306,208 | A | | 12/1981 | Coors | |
|---|---|---|---|---|---|
| 5,689,285 | A | * | 11/1997 | Asher | 345/161 |
| 6,043,806 | A | * | 3/2000 | Atwell et al. | 345/161 |
| 6,445,311 | B1 | * | 9/2002 | Hohl et al. | 341/20 |
| 7,242,390 | B2 | * | 7/2007 | Bader et al. | 345/161 |
| 2003/0117132 | A1 | * | 6/2003 | Klinghult | 324/207.25 |
| 2006/0131156 | A1 | * | 6/2006 | Voelckers | 200/512 |
| 2006/0164403 | A1 | * | 7/2006 | Volckers | 345/184 |
| 2007/0242043 | A1 | * | 10/2007 | Yang et al. | 345/161 |
| 2008/0116885 | A1 | * | 5/2008 | Van Zon et al. | 324/207.21 |

FOREIGN PATENT DOCUMENTS

| EP | 0 539 599 | 5/1993 |
|---|---|---|
| EP | 0 810 544 | 12/1997 |

OTHER PUBLICATIONS

International Preliminary Report on Patentability for International Application No. PCT/IB2007/003453 dated Aug. 25, 2009.
International Search Report and Written Opinion for International Application No. PCT/IB2007/003453 dated Oct. 6, 2008.

* cited by examiner

*Primary Examiner*—Nitin Patel
(74) *Attorney, Agent, or Firm*—Renner, Otto, Boisselle & Sklar, LLP (57) ABSTRACT A portable electronic device includes communication circuitry operative to establish a communication over a communication network, an input device for entering at least one user input into the electronic device, and at least one contactless sensor. The contactless sensor is operative to detect at least one of motion or position of the input device relative to the electronic device.

25 Claims, 5 Drawing Sheets

INDUCTIVE JOYSTICK

TECHNICAL FIELD OF THE INVENTION

The present invention relates generally to electronic devices, such as electronic devices for engaging in voice communications. More particularly, the invention relates to a user input device for use in electronic devices.

DESCRIPTION OF THE RELATED ART

Mobile and/or wireless items of electronic devices are becoming increasingly popular. For example, mobile telephones are now in wide-spread use. In addition, the features associated with certain types of electronic devices have become increasingly diverse. To name a few examples, many electronic devices include cameras, text messaging capability, Internet browsing functionality, electronic mail capability, video playback capability, audio playback capability, image display capability, navigation capability, and hands-free headset interfaces.

Some mobile phones include special input devices that simplify use of the mobile phone. For example, a joystick or the like may be used to make menu selections or to navigate to specific regions of a display. In this sense, the joystick may be analogous to a mouse (e.g., a point and click input device). In addition, the joystick also may be used as a game controller, wherein movement of the joystick causes a corresponding movement of one or more objects on the mobile phone's display.

SUMMARY

Conventional user input devices utilized on electronic equipment, such as mobile phones, typically employ mechanical switches (e.g., micro-switches) to indicate operation of the input device. A micro-switch is a small mechanical switch that includes an actuator button for activating the switch. The micro-switch typically includes two conductors separated by a gap, wherein when the actuator button is pressed the gap between the conductors is bridged, thereby completing a circuit between the two conductors.

While such micro-switches are effective for user input devices embodied as keypads (or any input device that requires only on on/off signal), they are less effective for other types of user input devices, such as joysticks or other motion sensitive input devices. In particular, the sensitivity of joysticks that utilize micro-switches is not optimal and/or variable. This is due in part to the use of a single switch for each direction (or a combination of two switches to achieve diagonal movement). For example, if a single switch is provided for each of a forward, reverse, left and right movement of the joystick, then only a single signal is available for each direction. Thus, as a particular movement is requested (e.g., a forward movement of the cursor, pointer or object), the movement of the cursor/pointer/object on the display is at a fixed speed. There is no way for the user to vary the speed; the object simply is moving or it is not moving. While additional switches may be added to provide an indication of the degree of deflection of the joystick, such configurations are not practical, particularly when a high degree of control is desired from the joystick.

Further, operation of the switches may degrade due to contamination and/or wear. Contamination is particularly a problem with micro-switches, wherein if a contaminant forms between contact surfaces of the switch, contact closure may not be detected. Further, oxidation of the contact surface can increase the impedance of the switch, which can lead to erratic operation.

The present invention enables a user input device utilized on electronic devices, such as a mobile phone, to provide data corresponding to a degree of deflection of the user input device. For example, data from a joystick or the like can correspond to an amount or degree of deflection of the joystick. Using this data, the electronic device may be configured such that a user can control not only movement of cursors/pointers/objects on the mobile phone's display, but also the rate of movement of the cursor/pointer/object (i.e., a velocity).

Additionally, actuation of the user input device may be detected without physical contact between the user input device and position or motion sensor. For example, actuation of the user input device may be detected optically, inductively, or based on the Hall effect. Such contactless detection is advantageous for several reasons. For example, since physical contacts no longer exist, contamination of the contact surfaces is no longer an issue. Similarly, since physical contact between the user input device and the detector device is absent, mechanical wear does not occur.

According to one aspect of the invention, a portable electronic device includes: communication circuitry operative to establish a communication over a communication network; an input device for entering at least one user input into the electronic device; and at least one contactless sensor operative to detect at least one of motion or position of the input device relative to the electronic device.

According to one aspect of the invention, the device further includes a trackable device attached to and movable with the input device, wherein the at least one contactless sensor is fixedly positioned in the electronic device so as to obtain position or motion data of the trackable device as the trackable device moves along a motion trajectory.

According to one aspect of the invention, the trackable device is a magnet or a light emitting device.

According to one aspect of the invention, the at least one contactless sensor is a coil, a Hall effect sensor, or an optical sensor.

According to one aspect of the invention, the device further includes a magnetic device attached to the input device, wherein when the input device is actuated the magnetic device is moved relative to the at least one sensor so as to induce a current through the at least one sensor.

According to one aspect of the invention, the device further includes circuitry operative to detect changes in current flowing through or voltage across the at least one sensor, and to correlate changes in current or voltage with movement or position of the input device relative to the electronic device.

According to one aspect of the invention, the device further includes a magnetic device attached to the input device, wherein when the input device is actuated the magnetic device is moved relative to the at least one sensor so as to detect a voltage potential across a conductor carrying a current through the magnetic field.

According to one aspect of the invention, the device further includes circuitry operative to detect changes in voltage across the conductor, and to correlate changes in voltage with movement or position of the input device relative to the electronic device.

According to one aspect of the invention, the at least one sensor is a plurality of sensors arranged along a motion trajectory of the input device.

According to one aspect of the invention, the device further includes a resiliently deflectable device arranged relative to the input device, wherein the input device is configured to contact the resiliently deflectable device when the input device is moved a predetermined distance so as to provide tactile feedback to a user of the input device.

According to one aspect of the invention, a plurality of resiliently deflectable devices are arranged at predetermined intervals along a motion trajectory of the input device.

According to one aspect of the invention, the device further includes at least one mechanical switch arranged relative to the user input device, wherein when the at least one contactless sensor fails, the at least one mechanical switch enables the user input device to operate at a reduced level of sensitivity.

According to one aspect of the invention, the device further includes a barrier between the at least one contactless sensor and the user input device.

According to one aspect of the invention, the barrier forms a hermetic seal around the at least one contactless sensor.

According to one aspect of the invention, the input device is a joystick or a D-pad.

According to one aspect of the invention, the device is a mobile telephone.

According to one aspect of the invention, the at least one contactless sensor is operative to provide a signal that corresponds to a relative movement of the input device.

According to one aspect of the invention, the device further includes a display device, and circuitry coupled to the at least one contactless sensor, wherein the circuitry is operative to move an object on the display based on data received from the at least one contactless sensor.

According to one aspect of the invention, the circuitry is further operative to vary a velocity of the object on the display as a function of an amount of deflection of the input device.

According to one aspect of the invention, the function implements a first slope for the object velocity with respect to the input device deflection in a first deflection region, and a second slope of the object velocity with respect to input device deflection in a second deflection region, said first slope being different from the second slope.

According to one aspect of the invention, the function is a non-linear function.

According to one aspect of the invention, a method for moving an object on a display of a portable electronic device, said electronic device including communication circuitry operative to establish a communication over a communication network, and an input device for entering at least one user input into the electronic device, said method including contactlessly detecting at least one of motion or position of the input device relative to the electronic device, and moving the object on the display to correspond to the detected motion or position.

According to one aspect of the invention, the method further includes providing tactile feedback to a user as the input device is manipulated, said tactile feedback indicative of a deflection of the input device relative to a maximum deflection of the input device.

According to one aspect of the invention, the method further includes detecting the at least one motion via a mechanical switch corresponding to the at least one contactless sensor, and using data obtained from the mechanical switch upon failure of the at least one contactless sensor.

According to one aspect of the invention, moving the object includes varying a velocity of the object on the display as a function of an amount of deflection of the input.

According to one aspect of the invention, varying the velocity includes using a function that implements a first slope for the object velocity with respect to the input device deflection in a first deflection region, and a second slope of the object velocity with respect to input device deflection in a second deflection region, said first slope being different from the second slope.

According to one aspect of the invention, varying the velocity includes using a non-linear function.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Embodiments of the present invention will now be described with reference to the drawings, wherein like reference numerals are used to refer to like elements throughout. It will be understood that the figures are not necessarily to scale.

The interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, personal digital assistants (PDAs), smart phones, portable communication apparatus or the like.

In the present application, embodiments of the invention are described primarily in the context of a mobile telephone. However, it will be appreciated that the invention is not intended to be limited to the context of a mobile telephone and may relate to any type of appropriate electronic equipment.

Figure 1:
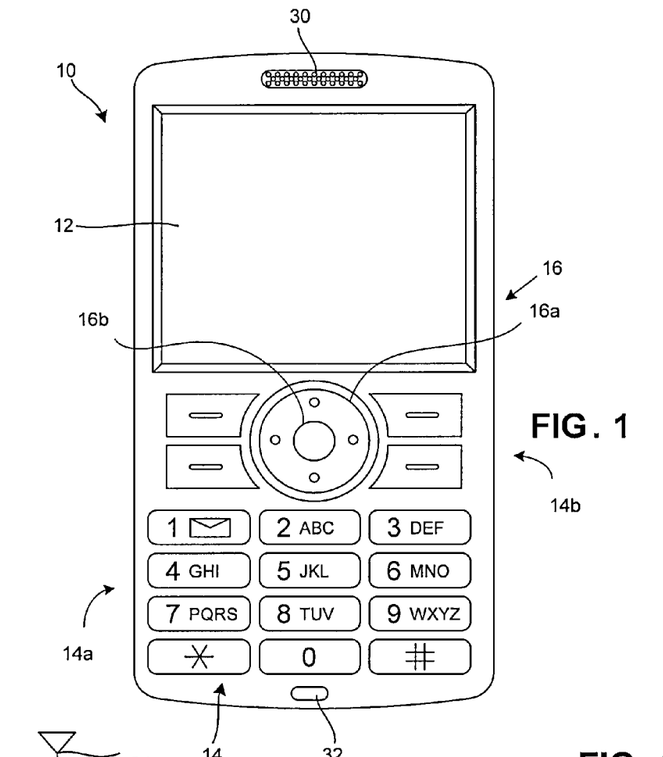
FIG. 1 is a schematic view of a mobile telephone as an exemplary electronic device in accordance with an embodiment of the present invention.
Figure 2:
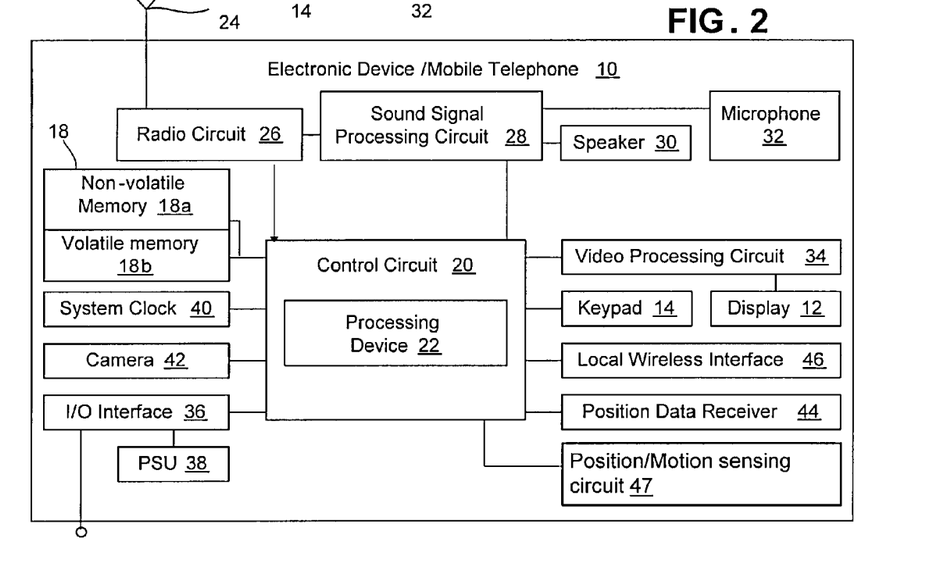
FIG. 2 is a schematic block diagram of the relevant portions of the mobile telephone of FIG. 1 in accordance with an embodiment of the present invention.

Referring initially to FIGS. 1 and 2, an electronic device 10 is shown. The electronic device of the illustrated embodiment is a mobile telephone and will be referred to as the mobile telephone 10. The mobile telephone 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

The mobile telephone 10 may include a display 12. The display 12 displays information to a user such as operating state, time, telephone numbers, contact information, various navigational menus, etc., which enable the user to utilize the various features of the mobile telephone 10. The display 12 also may be used to visually display content received by the mobile telephone 10 and/or retrieved from a memory 18 (FIG. 2) of the mobile telephone 10. The display 12 may be used to present images, video and other graphics to the user, such as photographs, mobile television content and video associated with games.

A keypad 14 provides for a variety of user input operations. For example, the keypad 14 typically includes alphanumeric keys 14a for allowing entry of alphanumeric information such as telephone numbers, phone lists, contact information, notes, etc. In addition, the keypad 14 typically includes special function keys 14b such as a "call send" key for initiating or answering a call, and a "call end" key for ending or "hanging up" a call. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 12. Also, the display 12 and keypad 14 may be used in conjunction with one another to implement soft key functionality.

The mobile telephone also includes one or more navigation keys 16, such as a joystick 16a and/or directional pad (D-pad) 16b, for example, which enable the mobile telephone 10 to accept directional inputs from a user. The navigation keys 16 may be used to provide enhanced interaction with games stored on the mobile telephone 10, or to quickly navigate through menus of the mobile telephone 10.

For instance, the joystick 16a and/or D-pad 16b may function as a pointing device for moving to specific regions on the display 12. Further, a velocity of a pointer or object on the display 12 may correspond to an amount of deflection of the joystick 16a and/or D-pad 16b (e.g., the velocity may be proportional to the amount of deflection). Further details regarding the navigations keys 16 will be discussed below.

The mobile telephone 10 also includes call circuitry that enables the mobile telephone 10 to establish a call and/or exchange signals with a called/calling device, typically another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The mobile telephone 10 may be configured to transmit, receive and/or process data, such as text messages (e.g., a text message is commonly referred to by some as "an SMS," which stands for short message service), instant messages, electronic mail messages, multimedia messages (e.g., a multimedia message is commonly referred to by some as "an MMS," which stands for multimedia message service), image files, video files, audio files, ring tones, streaming audio, streaming video, data feeds (including podcasts) and so forth. Processing such data may include storing the data in the memory 18, executing applications to allow user interaction with data, displaying video and/or image content associated with the data, outputting audio sounds associated with the data and so forth.

FIG. 2 represents a functional block diagram of the mobile telephone 10. For the sake of brevity, generally conventional features of the mobile telephone 10 will not be described in great detail herein.

The mobile telephone 10 includes a primary control circuit 20 that is configured to carry out overall control of the functions and operations of the mobile telephone 10. The control circuit 20 may include a processing device 22, such as a CPU, microcontroller or microprocessor. The processing device 22 executes code stored in a memory (not shown) within the control circuit 20 and/or in a separate memory, such as the memory 18, in order to carry out operation of the mobile telephone 10.

The memory 18 may include a read only memory area that is implemented using nonvolatile memory 18a, and a random access or system memory area that is implemented using volatile memory 18b. As will be appreciated, nonvolatile memory tends not to lose data storage capability upon loss of power and is typically used to store data, application code, files and so forth. The nonvolatile memory 18a may be implemented with a flash memory, for example. The flash memory may have a NAND architecture, but other flash memory architectures, such as a NOR architecture, may be used. As will be appreciated, volatile memory tends to lose data storage capability upon loss of power and is typically used to store data for access by the processing device 22 during the execution of logical routines. The volatile memory 18b may be a random access memory (RAM). The RAM may be a synchronous dynamic random access memory (SDRAM), for example, but other RAM architectures that utilize memory blocks may be used. Data may be exchanged between the nonvolatile memory 18a and the volatile memory 18b as is conventional. The nonvolatile memory 18a and the volatile memory 18b may be sized as is appropriate for the mobile telephone 10 or other electronic device in which the memory 18 is used.

In addition, the processing device 22 may execute code that implements various functions of the mobile telephone 10. It will be apparent to a person having ordinary skill in the art of computer programming, and specifically in application programming for mobile telephones or other electronic devices, how to program a mobile telephone 10 to operate and carry out logical functions associated with the operation of the mobile telephone. Accordingly, details as to specific programming code have been left out for the sake of brevity. Also, while the functional operations of the mobile telephone 10 are executed by the processing device 22 in accordance with a preferred embodiment of the invention, such functionality could also be carried out via dedicated hardware, firmware, software, or combinations thereof, without departing from the scope of the invention.

Continuing to refer to FIGS. 1 and 2, the mobile telephone 10 includes an antenna 24 coupled to a radio circuit 26. The radio circuit 26 includes a radio frequency transmitter and receiver for transmitting and receiving signals via the antenna 24 as is conventional. The radio circuit 26 may be configured to operate in a mobile communications system and may be used to send and receive data and/or audiovisual content. Receiver types for interaction with a mobile radio network and/or broadcasting network include, but are not limited to, GSM, CDMA, WCDMA, GPRS, WiFi, WiMax, DVB-H, ISDB-T, etc., as well as advanced versions of these standards.

The mobile telephone 10 further includes a sound signal processing circuit 28 for processing audio signals transmitted by and received from the radio circuit 26. Coupled to the sound processing circuit 28 are a speaker 30 and a microphone 32 that enable a user to listen and speak via the mobile telephone 10 as is conventional. The radio circuit 26 and sound processing circuit 28 are each coupled to the control circuit 20 so as to carry out overall operation. Audio data may be passed from the control circuit 20 to the sound signal processing circuit 28 for playback to the user. The audio data may include, for example, audio data from an audio file stored by the memory 18 and retrieved by the control circuit 20, or received audio data such as in the form of streaming audio data from a mobile radio service. The sound processing circuit 28 may include any appropriate buffers, decoders, amplifiers and so forth.

The display 12 may be coupled to the control circuit 20 by a video processing circuit 34 that converts video data to a video signal used to drive the display 14. The video processing circuit 34 may include any appropriate buffers, decoders, video data processors and so forth. The video data may be generated by the control circuit 20, retrieved from a video file that is stored in the memory 18, derived from an incoming video data stream that is received by the radio circuit 28 or obtained by any other suitable method.

The mobile telephone 10 may further include one or more I/O interface(s) 36. The I/O interface(s) 36 may be in the form of typical mobile telephone I/O interfaces and may include one or more electrical connectors. As is typical, the I/O interface(s) 36 may be used to couple the mobile telephone 10 to a battery charger to charge a battery of a power supply unit (PSU) 38 within the mobile telephone 10. In addition, or in the alternative, the I/O interface(s) 36 may serve to connect the mobile telephone 10 to a headset assembly (e.g., a personal handsfree (PHF) device) that has a wired interface with the mobile telephone 10. Further, the I/O interface(s) 36 may serve to connect the mobile telephone 10 to a personal computer or other device via a data cable for the exchange of data. The mobile telephone 10 may receive operating power via the I/O interface(s) 36 when connected to a vehicle power adapter or an electricity outlet power adapter.

The mobile telephone 10 also may include a system clock 40 for clocking the various components of the mobile telephone 10, such as the control circuit 20. The control circuit 20 may, in turn, carry out timing functions, such as timing the durations of calls, generating the content of time and date stamps, and so forth.

The mobile telephone 10 may include a camera 42 for taking digital pictures and/or movies. Image and/or video files corresponding to the pictures and/or movies may be stored in the memory 18.

The mobile telephone 10 also may include a position data receiver 44, such as a global positioning system (GPS) receiver, Galileo satellite system receiver or the like.

The mobile telephone 10 also may include a local wireless interface 46, such as an infrared transceiver and/or an RF interface (e.g., a Bluetooth interface), for establishing communication with an accessory, another mobile radio terminal, a computer or another device. For example, the local wireless interface 46 may operatively couple the mobile telephone 10 to a headset assembly (e.g., a PHF device) in an embodiment where the headset assembly has a corresponding wireless interface.

The mobile telephone 10 also may include a position/motion sensing circuit 47 for determining position and/or motion of a user input device. More specifically, the position/motion sensing circuit 47 can identify position and/or motion of at least part of the user input device without physically contacting the user input device. The position/motion sensing circuit 47 can include circuitry for receiving position/motion data from sensors that monitor the user input device. The circuitry may be configured to accept a voltage, current, or optical input, for example. Based on the received position/motion data, the position/motion sensing circuit 47 can determine not only when the user input device is being actuated, but a degree of the actuation (e.g., the amount of deflection of the user input device relative to its maximum deflection). Circuitry to perform such functions can be readily developed by one skilled in the art and, therefore, will not be described herein.

Figure 3:
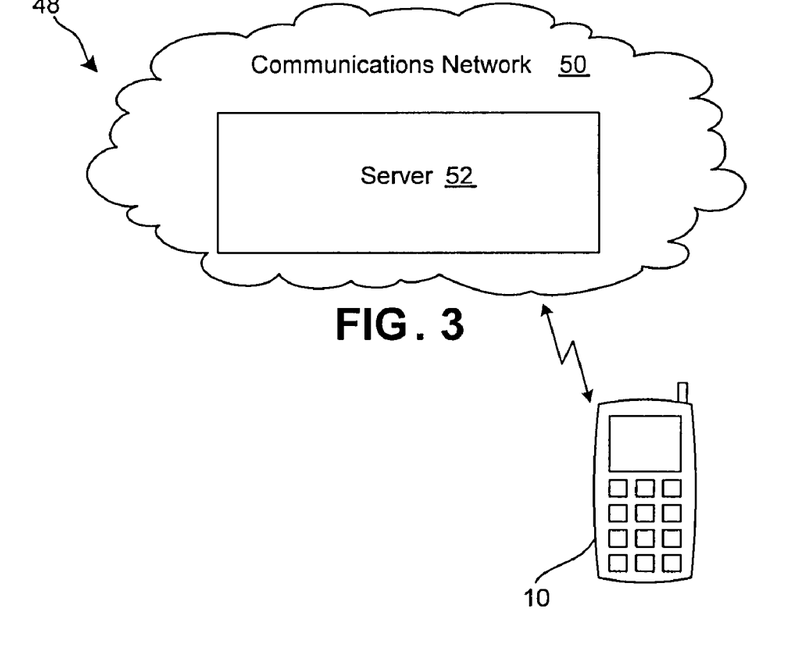
FIG. 3 is a schematic diagram of a communications system in which the mobile telephone of FIG. 1 may operate.

With additional reference to FIG. 3, the mobile telephone 10 may be configured to operate as part of a communications system 48. The system 48 may include a communications network 50 having a server 52 (or servers) for managing calls placed by and destined to the mobile telephone 10, transmitting data to the mobile telephone 10 and carrying out any other support functions. The server 52 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 50 may support the communications activity of multiple mobile telephones 10 and other types of end user devices.

As will be appreciated, the server 52 may be configured as a typical computer system used to carry out server functions and may include a processor configured to execute software containing logical instructions that embody the functions of the server 52 and a memory to store such software.

Implementation of the navigation keys 16 in accordance with an aspect of the invention will now be discussed. It is noted that while the invention is described with respect to the navigation keys 16, the principles of the invention may be applied to other user input devices, including the alphanumeric keys 14a and special function keys 14b, for example, and reference to the navigation keys 16 is not intended to be limiting in any way.

Figure 4A:
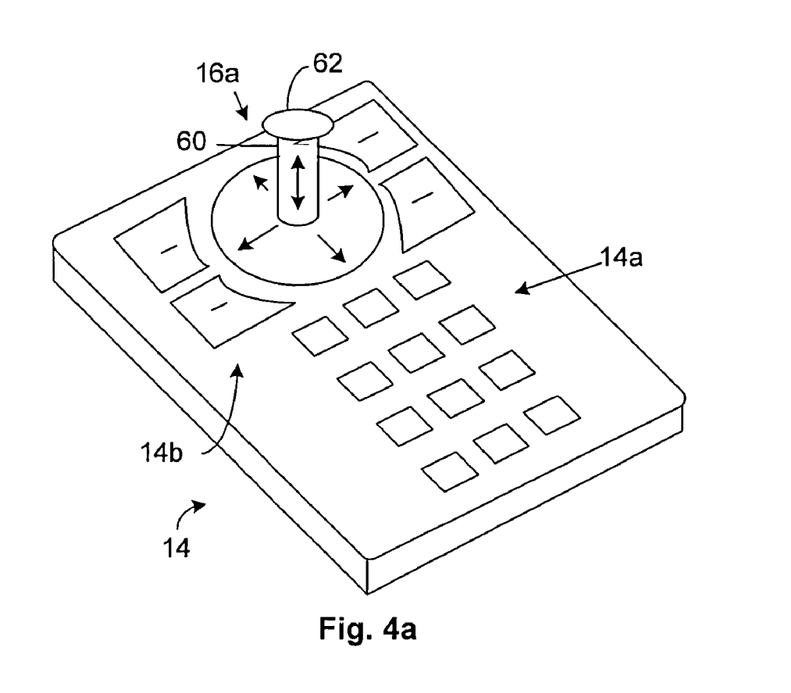
FIG. 4a is a perspective view of an exemplary keypad that includes a navigation key in the form of a joystick.
Figure 4B:
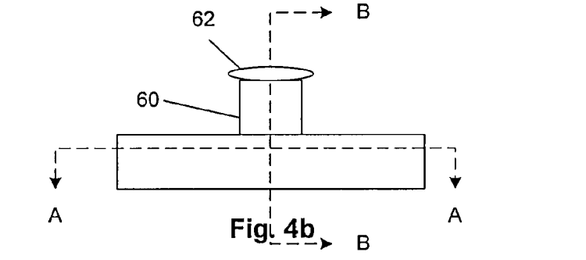
FIG. 4b is a side view of the exemplary keypad of FIG. 4a looking from the alpha-numeric keys up toward the joystick.

Moving to FIG. 4a, a perspective view of an exemplary keypad 14 of the mobile telephone 10 is provided. As noted previously, the exemplary keypad 14, in addition to having conventional alphanumeric keys 14a and special function keys 14b, also includes navigations keys 16, such as a joystick 16a, for example. FIG. 4b shows a side view of the keypad 14 looking from the alpha-numeric keys 14a toward the joystick 16a.

The joystick 16a includes an elongated shaft 60 having a proximal end 62 for manipulation of the joystick 16a by a user. For example, the joystick 16a can be operated by moving the proximal end 62 to a desired location, which produces a corresponding movement of a cursor/pointer/object on the display 12 of the mobile telephone 10.

Figure 4C:
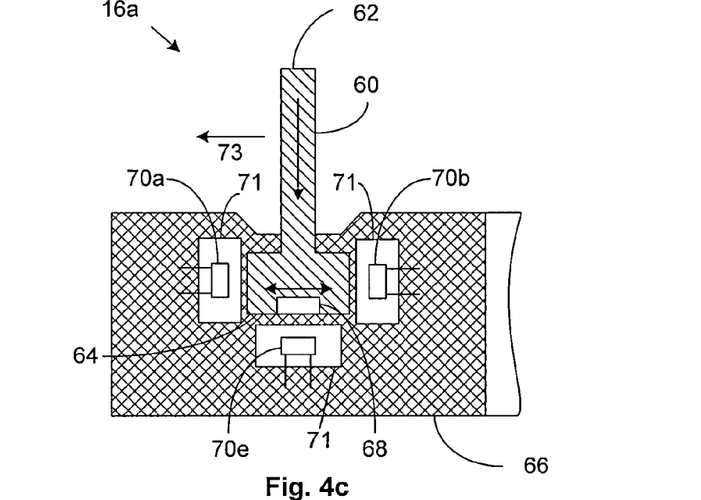
FIG. 4c is a cross section view of the joystick taken along section B-B of FIG. 4b.
Figure 4D:
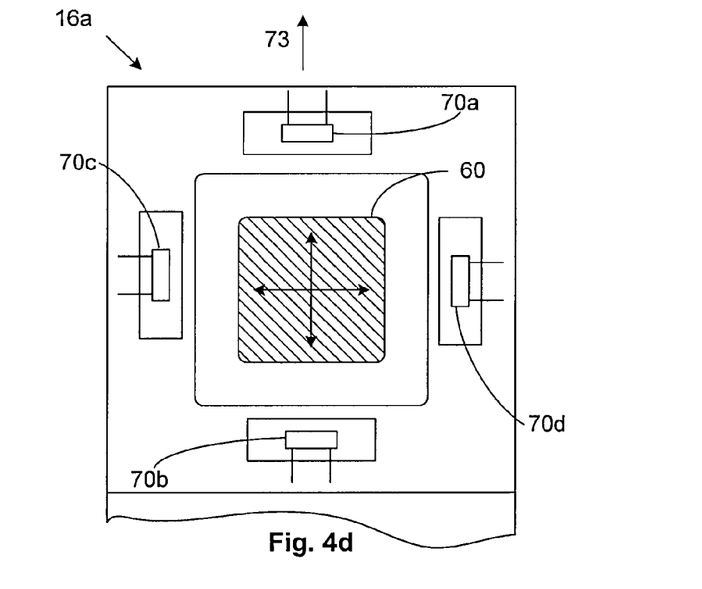
FIG. 4d is a cross section view of the joystick taken along section A-A of FIG. 4b.

With further reference to FIGS. 4c and 4d, cross sectional views of the joystick 16a are provided (FIG. 4c shows the joystick along section B-B of FIG. 4b, and 4d shows the joystick along section A-A of FIG. 4b). The joystick shaft 60 is pivotally attached (not shown) to a mount or housing 66 such that the joystick 16a may be moved in a number of different directions about an axis of rotation. For example, the proximal end 62 of the joystick 16a may be manipulated in the forward, reverse, left, right, diagonal, etc., directions. Further, the joystick 16a may be moved in an inward or outward direction relative to the keypad 14 (e.g., pushed into the keypad or pull out from the keypad).

For left, right, forward, reverse, and diagonal movement of the proximal end 62, the distal end 64 of the joystick 16a moves in a direction opposite that of the proximal end 62, wherein the amount of movement of the distal end 64 corresponds to the amount of movement of the proximal end 62. In/out movement of the proximal end 62 produces a corresponding in/out movement of the distal end 64.

Located in the distal end 64 of the shaft 60 is a trackable device 68 (e.g., a magnet, an LED, etc.), wherein the trackable device 68 moves with the distal end 64. Although only a single trackable device 68 is shown, multiple trackable devices may be implemented to enhance the accuracy of the joystick 16a (or of a D-pad). For example, a trackable device 68 may be implemented on each side portion of the distal end 64 (e.g., on a front side, back side, left side and right side of the distal end 64), as well as the bottom portion.

One or more sensors 70a-70e are arranged within or attached to the housing 64 so as to correspond to a direction of movement of the distal end 64 (e.g., sensor 70a detects forward movement, sensor 70b detects reverse movement, sensor 70c detects left movement, sensor 70d detects right movement, and sensor 70e detects in/out movement). The sensors 70a-70e, for example, may be a coil, a Hall sensor, an optical sensor, or any other contactless sensor. The trackable device 68 may be a magnet or LED, for example, or any other device that may be tracked without physical contact.

Each sensor is operatively coupled to the position/motion sensing circuit 47, which collects data corresponding to positional changes of the trackable device 68 relative to each respective sensor. A barrier 71 may be formed between the sensors 70a-70e and the trackable device 68 (e.g., a barrier that separates the sensors from the user input device) so as to prevent contact between the trackable device 68 and the sensors 70a-70e. The barrier 71 may be formed around each individual sensor, for example. Alternatively, the barrier 71 may be formed as a partition or divider between the trackable device 68 and the sensors 70a-70e. In this sense, the barrier effectively segregates the sensors from the user input device.

In one embodiment, the barrier 71 hermetically seals the sensors 70a-70e from the outside environment. For example, a resin or potting compound may be formed around the sensors 70a-70e so as to shield them from the surrounding environment. This can prevent contaminants from affecting the performance of the sensors, for example.

As the joystick 16a is manipulated into different positions, the trackable device 68 moves relative to each sensor 70a-70e. In the case of a sensor embodied as a coil and a trackable device embodied as a magnet, the relative movement of the magnet with respect to the coils induces a current in the coils. Data corresponding to the induced current is collected and used by the position/motion sensing circuit 47 to determine a location of the magnet and, thus, a location of the distal end 64 of the joystick 16a. This determined location then is provided to the control circuit 20, which acts upon the requested input.

For example, a cursor, pointer, object, etc. shown on the display 12 can be moved so as to correspond to the requested input (e.g., deflection of the proximal end 62 of the joystick in the forward direction 73 causes the cursor/pointer/object on the display 12 to move forward). Moreover, since the induced current flowing through the coils is affected by the degree of movement of the magnet, the position/motion sensing circuit 47 can determine the precise location of the distal end 64 within its range of motion. This precise location can be provided to the control circuit 20, which can set a velocity of the cursor/pointer/object on the display 12 to correspond to the amount of deflection of the joystick 16a.

For example, the velocity of the cursor/pointer/object on the display 12 can be proportional (e.g., linear) to the amount of deflection relative to a maximum deflection (e.g., a slope of 1, wherein 10% deflection provides 10% of maximum velocity, 30% deflection provides 30% of maximum velocity, 50% deflection provides 50% of maximum velocity, etc.). Alternatively, the velocity of the cursor/pointer/object on the display 12 can have different slopes based on the amount of joystick deflection.

More specifically, a slope of the velocity with respect to joystick deflection may be altered in a specific deflection region to provide precise control of the cursor/pointer/object. For example, and briefly referring to FIG. 5, a plot of object velocity with respect to joystick deflection is shown wherein the slope is altered depending on the amount of deflection. In a first region 74 (between 0 and 20% deflection), the slope is 0.5, while in a second region 76 (20% to 100%) the slope is about 1.125. The smaller slope in the first region 74 enhances control of an object on the display, as the sensitivity of the input device is reduced in the low deflection range.

Figure 5:
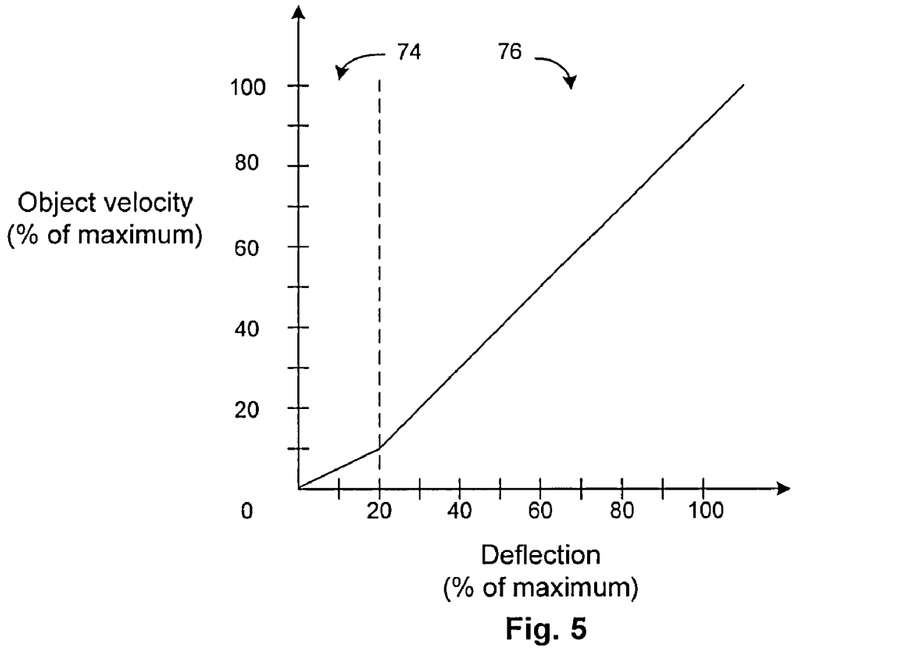
FIG. 5 is a graph illustrating velocity of a displayed object with respect to deflection of a joystick in accordance with an embodiment of the invention.

Although only two slopes are shown, multiple slopes may be used throughout the deflection range. In yet another example, the velocity can vary parabolically (or based on a predefined function) with respect to joystick deflection. These variations in velocity (multiple slope, parabolic, function) may be applied to any region of the input device's range of motion.

As noted above, the location of the joystick can be determined based on induced currents in the coils. For example, for slight or partial deflection of the proximal end 62 in the forward direction 73, the distal end 64 of the joystick 16a (and thus the trackable device 68) will move away from sensor 70a and toward sensor 70*b*. In the exemplary magnet/coil configuration, this causes the magnetic flux seen by the sensor 70*a* to decrease (e.g., the magnetic flux is weakening), which induces a current in the sensor 70*a* that starts at an initial value and decreases with further movement of the joystick 16*a* in the forward direction 73. Further, the magnetic flux seen by sensor 70*b* will begin to increase, which induces a current in sensor 70*b* that starts at an initial value and begins to increase with further movement of the joystick 16*a* in the forward direction 73. The position/motion sensing circuit 47 can base the relative position of the distal end 64 with respect to each sensor 70*a*-70*e* on the detected current flow in each sensor 70*a*-70*e*.

To further enhance the accuracy of the joystick 16*a*, a plurality of sensors can be utilized for each deflection direction. For example, instead of a single sensor for each of the forward, reverse, left, right and in/out directions, two or more sensors can be arranged along the deflection path of the trackable device 68. The additional sensors can provide increased signal-to-noise ratio relative to a single sensor for each deflection direction. Further, multiple sensors for each deflection path provide additional data that can be used by the position/motion sensing circuit 47 to enhance the accuracy of the position/motion detection.

Instead of using sensors 70*a*-70*e* embodied as a coil, the sensors 70*a*-70*e* may be embodied as a Hall effect sensor. As is well known, the Hall effect refers to a potential difference (Hall voltage) on opposite sides of an electrical conductor through which an electric current is flowing. The potential difference is created by a magnetic field applied perpendicular to the current.

An output voltage of the Hall effect sensor varies in response to changes in magnetic field density. Using a known magnetic field obtained from the trackable device 68 embodied as a magnet, the distance of the magnet from a Hall plate of the Hall effect sensor can be determined. This distance then can be provided to the position/motion detection circuit 47 (e.g., in the form of a voltage or current signal), which can use the data to determine a deflection direction and the amount of deflection of the input device.

Another sensor that may be utilized as sensors 70*a*-70*e* is an optical sensor. Optical sensors are advantageous, for example, because they are immune to electromagnetic interference. Further, optical sensors offer greater sensitivity relative to conventional sensors. When using an optical sensor, the trackable device 68 may be a light emitting device, such as an LED, for example.

The optical sensor can monitor the light emitting device and generate a signal that is proportional to a distance between the sensor and the light emitting device. The signal may be a voltage or current output signal, for example, which is provided to the position/motion sensing circuit 47. Based on this detected distance, a deflection direction and degree can be ascertained by the position/motion sensing circuit 47.

Figure 6:
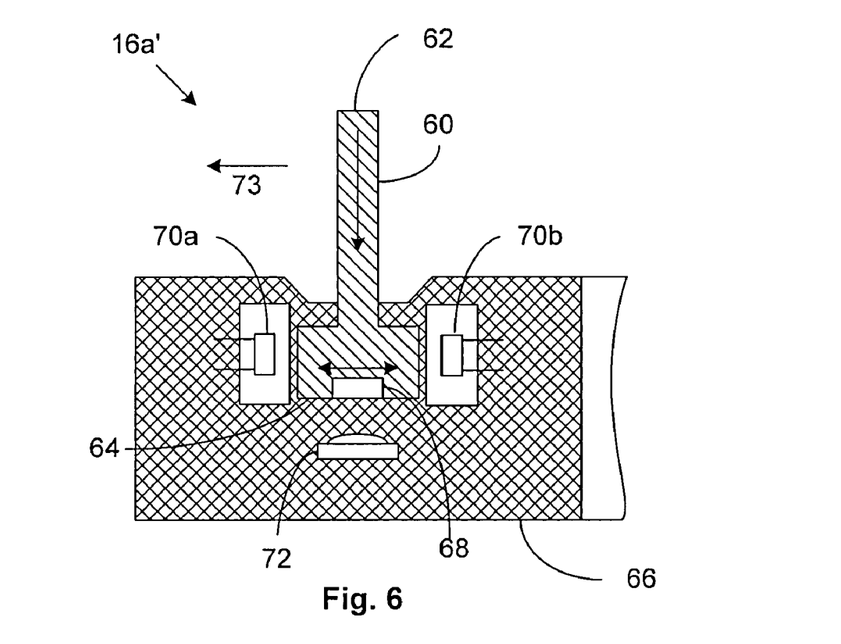
FIG. 6 is a sectional view of another exemplary user input device in accordance with an embodiment of the invention.

Moving now to FIG. 6, another embodiment of the joystick is shown. The joystick 16*a*' of FIG. 5 is similar to the joystick 16*a* of FIGS. 4*c* and 4*d*, except instead of having a contactless sensor 70*e* to detect in/out movement of the joystick, the joystick 16*a*' utilizes a switch, such as a dome switch 72 or the like. A dome switch is a type of mechanical switch, wherein a pair of conductors are formed so as to be separated by a gap. A resiliently deformable conductive layer is formed over the two conductors in the shape of a dome. In its normal state, the dome shaped conductive layer does not contact the conductors, and thus the circuit is not complete. However, when the dome shaped conductive layer is pressed onto the circuit board, it makes contact with both conductors and bridges the gap between the two conductors, thereby completing the circuit between the conductors.

Since sensitivity of the joystick generally is not an issue with respect to in/out movement of the joystick shaft 60, the dome switch 72 can provide satisfactory operation of the joystick 16*a*' while at the same time reducing costs. It is noted, however, that the embodiment of FIG. 5 can only detect inward movement of the joystick 16*a*' (and release from the in position). Detection of outward movement would require an additional switch (not shown).

As the joystick is moved in the inward direction (i.e., the shaft 60 is traveling toward the dome switch 72), the distal end 64 of the shaft 60 contacts a dome portion of the dome switch 72 and, with sufficient pressure, the dome portion is collapsed onto two conductors located beneath the dome portion. Since an inner surface of the dome portion is conductive, as the inner surface contacts the two conductors, the switch is closed. This closure can be provided to the control circuit 20, which process the data to produce a desired result.

Figure 7:
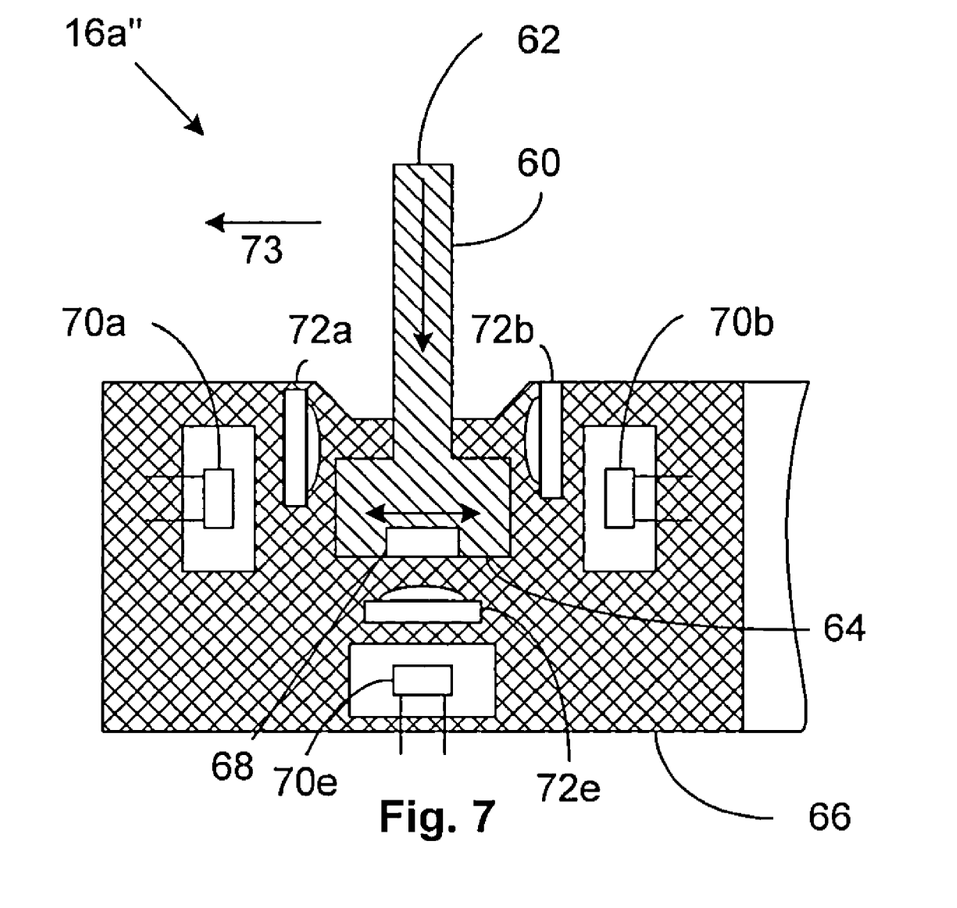
FIG. 7 is a sectional view of yet another exemplary user input device in accordance with an embodiment of the invention.

FIG. 7 shows yet another embodiment of the joystick. The joystick 16*a*'' of FIG. 6 is similar to the joystick 16*a* of FIGS. 4*c* and 4*d*, but further includes switches, such as dome switches 72*a*-72*e*, corresponding to respective sensors 70*a*-70*e*. The switches 72*a*-72*e* may be used to provide redundancy in the event that one or more sensors 70*a*-70*e* fail. For example, if the forward sensor 70*a* fails, the forward switch 72*a* can be used to identify forward motion of the joystick 16*a*'', and thus the joystick will remain operational. However, the sensitivity of the joystick 16*a*'' in the forward direction (or any component thereof) will be reduced, while the sensitivity if the remaining directions will be retained. As will be appreciated, other switches also may be used for redundancy purposes, including micro-switches, for example.

Alternatively, dome switches 72*a*-72*e* may be utilized only to provide tactile feedback to a user of the joystick 16*a*''. In this sense, the dome switches may be referred to as a feedback device, and need not include an actual switching function (i.e., the switch portion is not utilized, or may not even be present). For example, a dome switch generally comprises a resiliently deflectable center portion. This deflectable center portion provides a specific "feel" to a user of the joystick when the dome switch is closed. By locating the deflectable center portion such that it deflects within a specific range of motion of the joystick 16*a*'', the user can know that he has made a specific request.

For example, the deflectable center portion of the dome switch 72*a*-72*e* can be arranged such that it deflects at about halfway through the full motion of the joystick 16*a*'' for each direction. Thus, as the user moves the joystick 16*a*'', he can be alerted via the deflection of the center portion that a particular range of motion has been achieved. Further, additional deflectable center portions may be arranged along the trajectory of the distal end 64 so as to provide tactile feedback throughout the range of motion of the joystick (e.g., at 25%, 50%, 75% and 100% deflection), Accordingly, an electronic device that utilizes a contactless sensor to determine position or motion of an input device has been described. The device provides enhanced precision relative to conventional input devices utilized on electronic equipment, thereby enabling precise control of objects displayed on the electronic device. Further, since the sensor operates without physical contact, mechanical wear of the sensor is not an issue.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A portable electronic device, comprising:
   communication circuitry operative to establish a communication over a communication network;
   an input device for entering at least one user input into the electronic device;
   at least one contactless sensor operative to detect at least one of motion or position of the input device relative to the electronic device; and
   a resiliently deflectable device arranged relative to the input device, wherein the input device is configured to contact the resiliently deflectable device when the input device is moved a predetermined distance so as to provide tactile feedback to a user of the input device.

2. The device of claim 1, further comprising a trackable device attached to and movable with the input device, wherein the at least one contactless sensor is fixedly positioned in the electronic device so as to obtain position or motion data of the trackable device as the trackable device moves along a motion trajectory.

3. The device of claim 2, wherein the trackable device is a magnet or a light emitting device.

4. The device of claim 1, wherein the at least one contactless sensor is a coil, a Hall effect sensor, or an optical sensor.

5. The device of claim 1, further comprising a magnetic device attached to the input device, wherein when the input device is actuated the magnetic device is moved relative to the at least one sensor so as to induce a current through the at least one sensor.

6. The device of claim 5, further comprising circuitry operative to detect changes in current flowing through or voltage across the at least one sensor, and to correlate changes in current or voltage with movement or position of the input device relative to the electronic device.

7. The device of claim 1, further comprising a magnetic device attached to the input device, wherein when the input device is actuated the magnetic device is moved relative to the at least one sensor so as to detect a voltage potential across a conductor carrying a current through the magnetic field.

8. The device of claim 7, further comprising circuitry operative to detect changes in voltage across the conductor, and to correlate changes in voltage with movement or position of the input device relative to the electronic device.

9. The device of claim 1, wherein the at least one sensor is a plurality of sensors arranged along a motion trajectory of the input device.

10. The device of claim 1, wherein a plurality of resiliently deflectable devices are arranged at predetermined intervals along a motion trajectory of the input device.

11. The device of claim 1, further comprising at least one mechanical switch arranged relative to the user input device, wherein when the at least one contactless sensor fails, the at least one mechanical switch enables the user input device to operate at a reduced level of sensitivity.

12. The device of claim 1, further comprising a barrier between the at least one contactless sensor and the user input device.

13. The device of claim 12, wherein the barrier forms a hermetic seal around the at least one contactless sensor.

14. The device of claim 1, wherein the input device is a joystick or a directional pad.

15. The device of claim 1, wherein the device is a mobile telephone.

16. The device of claim 1, wherein the at least one contactless sensor is operative to provide a signal that corresponds to a relative movement of the input device.

17. The device of claim 1, further comprising:
   a display device; and
   circuitry coupled to the at least one contactless sensor, wherein the circuitry is operative to move an object on the display based on data received from the at least one contactless sensor.

18. The device of claim 17, wherein the circuitry is further operative to vary a velocity of the object on the display as a function of an amount of deflection of the input device.

19. The device of claim 18, wherein the function implements a first slope for the object velocity with respect to the input device deflection in a first deflection region, and a second slope of the object velocity with respect to input device deflection in a second deflection region, said first slope being different from the second slope.

20. The device of claim 18, wherein the function is a non-linear function.

21. A method of moving an object on a display of a portable electronic device, said electronic device including communication circuitry operative to establish a communication over a communication network, and an input device for entering at least one user input into the electronic device, said method comprising:

contactlessly detecting at least one of motion or position of the input device relative to the electronic device;

moving the object on the display to correspond to the detected motion or position; and providing tactile feedback to a user as the input device is manipulated, said tactile feedback indicative of a deflection of the input device relative to a maximum deflection of the input device.

22. The method of claim 21, further comprising detecting the at least one motion via a mechanical switch corresponding to the at least one contactless sensor, and using data obtained from the mechanical switch upon failure of the at least one contactless sensor.

23. The method of claim 21, wherein moving the object includes varying a velocity of the object on the display as a function of an amount of deflection of the input.

24. The method of claim 23, wherein varying the velocity includes using a function that implements a first slope for the object velocity with respect to the input device deflection in a first deflection region, and a second slope of the object velocity with respect to input device deflection in a second deflection region, said first slope being different from the second slope.

25. The device of claim 23, wherein varying the velocity includes using a non-linear function.

* * * * *